(12) United States Patent
Pierce

(10) Patent No.: US 10,802,458 B2
(45) Date of Patent: Oct. 13, 2020

(54) SYSTEM FOR BUILDING AN INDUSTRIAL CONTROL PROGRAM FROM DEVICE TYPE CLASSES HAVING DEVICE SPECIFIC INSTRUCTIONS

(71) Applicant: Rockwell Automation Technologies, Inc., Mayfield Heights, OH (US)

(72) Inventor: Scott A. Pierce, Concord Township, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 113 days.

(21) Appl. No.: 15/673,636

(22) Filed: Aug. 10, 2017

(65) Prior Publication Data
US 2019/0049917 A1 Feb. 14, 2019

(51) Int. Cl.
*G05B 19/05* (2006.01)
*H04L 29/08* (2006.01)

(52) U.S. Cl.
CPC .......... *G05B 19/056* (2013.01); *H04L 67/125* (2013.01); *G05B 2219/13004* (2013.01)

(58) Field of Classification Search
CPC ........................................... G05B 2219/13004
USPC ...................................................... 700/83, 86
See application file for complete search history.

(56) References Cited

U.S. PATENT DOCUMENTS

| 6,643,555 | B1* | 11/2003 | Eller | G05B 19/0426 |
| | | | | 700/17 |
| 2002/0199031 | A1* | 12/2002 | Rust | G06F 8/24 |
| | | | | 719/315 |
| 2008/0188960 | A1* | 8/2008 | Nixon | G05B 19/41865 |
| | | | | 700/86 |
| 2016/0132048 | A1* | 5/2016 | Kambe | G05B 19/41845 |
| | | | | 700/87 |

OTHER PUBLICATIONS

"PowerFlex Drives Configuration & Programming PowerFlex 525 & PowerFlex 755 AC Drives" Sep. 2015, 136 pages by Rockwell Automation (Year: 2015).*

* cited by examiner

*Primary Examiner* — Emilio J Saavedra
(74) *Attorney, Agent, or Firm* — Boyle Fredrickson, SC

(57) ABSTRACT

A program environment is configured to allow building an industrial control program by instantiating classes of device types corresponding to industrial control devices in which each device type includes a device profile defining parameter(s) for communicating with the type of device and instruction(s) for causing the type of device to take action(s) in the program. Accordingly, device-specific instructions can be injected into logic of the control program. Such device type classes can correspond to various types of devices, such as variable frequency drives, mass flow meters, HART devices, and the like. A user interface can connect to the program environment to allow such devices to be instantiated from the device type classes and/or displayed to a GUI a diagrammatical arrangement. As a result, the control program can be developed with increased speed and reduced complexity.

16 Claims, 2 Drawing Sheets

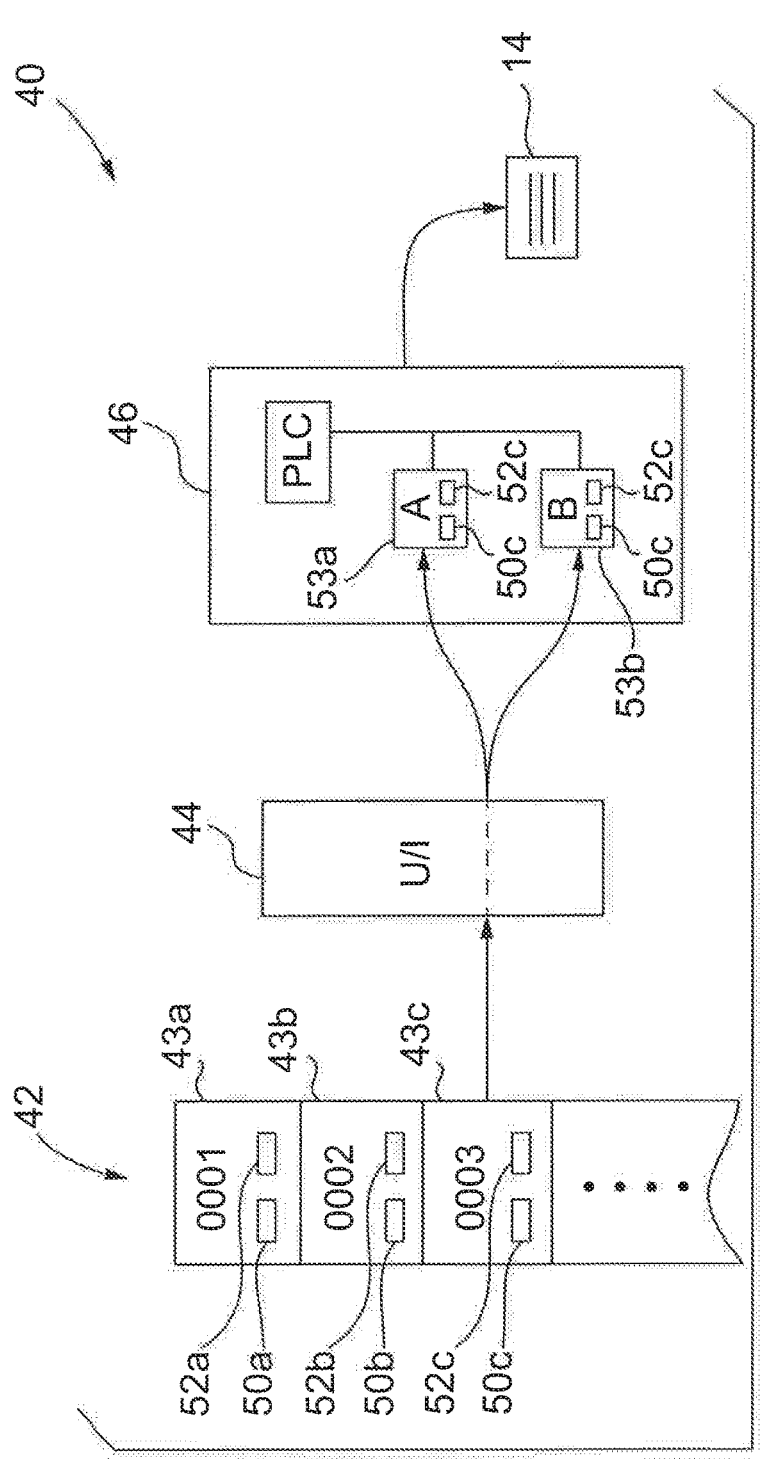
FIG. 2
FIG. 3
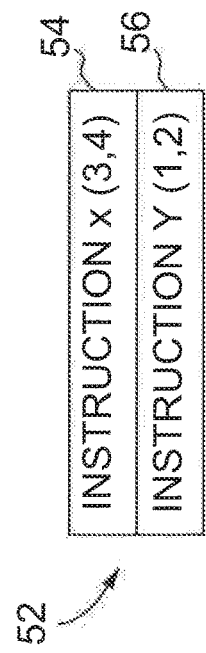
FIG. 4

SYSTEM FOR BUILDING AN INDUSTRIAL CONTROL PROGRAM FROM DEVICE TYPE CLASSES HAVING DEVICE SPECIFIC INSTRUCTIONS

FIELD OF THE INVENTION

The present invention relates to the field of industrial automation, and more particularly, to a system for building an industrial control program using device type classes in which each device type class corresponds to a type of industrial control device having a common configuration and each device type class includes a device profile configured to allow communication with an industrial control device corresponding to the device type class and at least one instruction configured to cause the industrial control device to execute an action.

BACKGROUND OF THE INVENTION

Industrial controllers are specialized computer systems used for the control of industrial processes or machinery, for example, in a factory environment. Generally, an industrial controller executes a stored control program that reads inputs from a variety of sensors associated with the controlled process and machine and, sensing the conditions of the process or machine and based on those inputs and a stored control program, calculates a set of outputs used to control actuators controlling the process or machine.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Generally, the controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, ControlNet) differ from standard communication networks (such as Ethernet) by guaranteeing maximum communication delays by pre-scheduling the communication capacity of the network, and/or providing redundant communication capabilities for high-availability.

As part of their enhanced modularity, industrial controllers may employ I/O modules or devices dedicated to a particular type of electrical signal and function, for example, detecting input AC or DC signals or controlling output AC or DC signals. Each of these I/O modules or devices may have a connector system allowing them to be installed in different combinations in a housing or rack along with other selected I/O modules or devices to match the demands of the particular application. Multiple or individual I/O modules or devices may be located at convenient control points near the controlled process or machine to communicate with a central industrial controller via the control network.

Control networks can also employ "connected messaging" in which the bandwidth of the network and buffer space is pre-allocated to dedicated "connections" to prevent lost or unpredictably delayed data transfer that can occur in standard network protocols such as Ethernet. An example of connected messaging is Common Industrial Protocol (CIP), which is a media independent industrial protocol for industrial automation applications supported by ODVA, Inc. CIP is described in "The Common Industrial Protocol (CIP™) and the Family of CIP Networks," Copyright 2016, ODVA, Inc., which document is incorporated herein by reference in its entirety.

CIP encompasses a comprehensive suite of messages and services for the collection of manufacturing automation applications, including control, safety, synchronization, motion, configuration and other information. Application extensions to CIP include: CIP Safety, providing a communication between nodes such as safety I/O blocks, safety interlock switches, safety light curtains and safety PLC's in safety applications up to Safety Integrity Level (SIL) 3 according to IEC 61508 standards; CIP Motion, allowing integration of field devices and motion drives on the same network thereby eliminating the need for a separate motion optimized network; and CIP Sync, a time synchronization extension to CIP based on the recent IEEE-1588 standard—Precision Clock Synchronization Protocol for Networked Measurement and Control Systems—providing increased control coordination for sequencing demanding events recording, distributed motion control and other distributed applications. CIP maximizes compatibility among devices in an industrial system, and typical control networks implementing CIP include EtherNet/IP, DeviceNet, ControlNet and similar networks whose specifications are published and whose protocols are used broadly by a number of manufacturers and suppliers.

To build an industrial control system, it is often desirable to prepare the control program to utilize the industrial control devices of the system in advance of commissioning. Device-specific instructions, Add-On Instructions (AO') and the like can be provided to users, including by way of sample control programs. However, it is typically up to the user to integrate the necessary instructions into control program for utilization in the user's desired system. As a result, users are required to spend more time investigating industrial control devices and preparing control programs using such devices. It is therefore desirable to provide a system which reduces the time and complexity for preparing a control program.

SUMMARY OF THE INVENTION

A program environment is configured to allow building an industrial control program by instantiating classes of device types corresponding to industrial control devices in which each device type includes a device profile defining parameter(s) for communicating with the type of device and instruction(s) for causing the type of device to take action(s) in the program. Accordingly, device-specific instructions can be injected into logic of the control program. Such device type classes can correspond to various types of devices, such as variable frequency drives, mass flow meters, HART devices, and the like. A user interface can connect to the program environment to allow such devices to be instantiated from the device type classes and/or displayed to a GUI a diagrammatical arrangement. As a result, the control program can be developed with increased speed and reduced complexity.

Accordingly, support for a device type can be separately installed into an industrial control system programming environment, such as a "device profile." The installed device profile can include inside it definitions for device-specific instructions that can be used in various programming languages in the programming environment. The device-specific instructions can be designed to make control of a device simpler and development of control programs take less time.

While using the device profile, a user can have the option of injecting the device-specific instructions into logic in the control program. Accordingly, the invention could be used in various ways, including: (1) injecting the device-specific instructions into a current project upon request by a user through a user interface of the device profile; (2) injecting the device-specific instructions into a current project upon a first instantiation of the device type; (3) injecting the device-specific instructions into a programming system itself for later selection, upon installation of the device profile; and/or (4) displaying the device-specific instructions of all installed device profiles in the context of programming for a user to select. As a result, the knowledge and/or effort required for a user to write logic associated with a device or application can be reduced with the preconfigured instructions based on expert knowledge from the device manufacturer.

Specifically then, one aspect of the present invention can provide a system for building an industrial control program, the system including: a data structure holding multiple device type classes, each device type class corresponding to a type of industrial control device having a common configuration, in which each device type class includes: a device profile configured to allow communication with an industrial control device corresponding to the device type class in an industrial control program; and at least one instruction configured to cause the industrial control device to execute an action; and a processor executing a program stored in a non-transient medium, the processor executing the program to: instantiate a model of an industrial control device from a device type class of the multiple device type classes in an industrial control program; and configure the industrial control program to include the instruction from the device type class.

Another aspect of the present invention can provide a method for building an industrial control program, the method including: (a) holding multiple device type classes in a data structure, each device type class corresponding to a type of industrial control device having a common configuration, in which each device type class includes: a device profile including multiple parameters configured to allow communication with an industrial control device corresponding to the device type class in an industrial control program; and at least one instruction configured to cause the industrial control device to execute an action, in which the instruction is configured to use at least one parameter of the multiple parameters; (b) instantiating a model of an industrial control device from a device type class of the multiple device type classes in an industrial control program; and (c) configuring the industrial control program to include the device-instruction from the device type class.

These and other objects, advantages and aspects of the invention will become apparent from the following description. The particular objects and advantages described. herein can apply to only some embodiments falling within the claims and thus do not define the scope of the invention, in the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which:

FIG. 2 is a diagram of a program environment for building the control program of FIG. 1 in accordance with aspect of the invention;

FIG. 3 is an exemplar device profile for a device type class in the program environment of FIG. 2;

FIG. 4 is an exemplar set of instructions for a device type class in the program environment of FIG. 2.

DETAILED DESCRIPTION OF THE OF THE INVENTION

Figure 1:
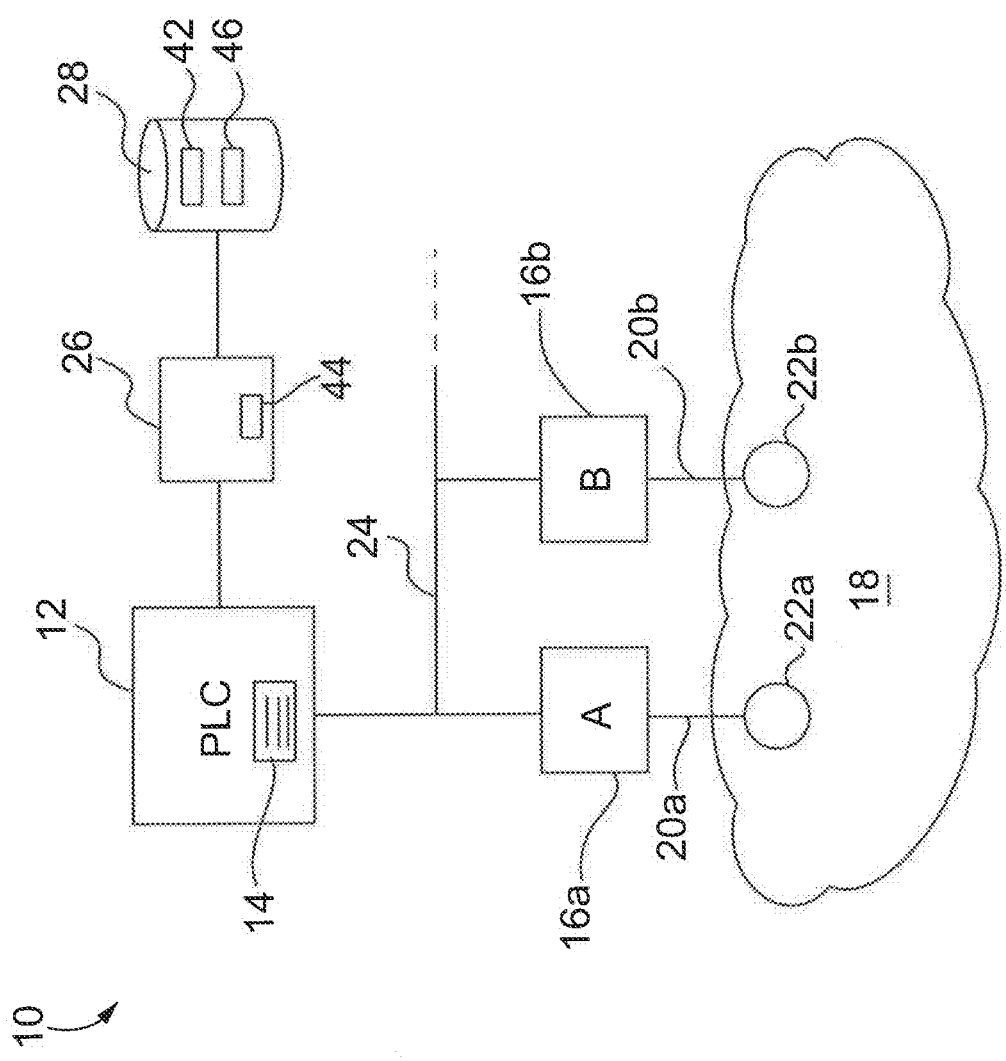
FIG. 1 is an exemplar industrial automation system including an industrial controller configured to execute a control program controlling devices in communication with an industrial process or machine in accordance with aspect of the invention.

Referring now to FIG. 1, in accordance with an aspect of the invention, an industrial automation system 10 can include an industrial controller 12 configured to execute an industrial control program 14. The controller 12, which could be a Programmable Logic Controller (PLC), such as a ControlLogix 5570 or 5580 Controller available from Rockwell Automation, Inc., can execute the control program 14 to control multiple industrial control devices 16, such as first and second devices 16*a* and 16*b* (labelled "A" and "B"), respectively, operating to control an industrial process or machine 18. The first and second devices 16*a* and 16*b*, respectively, can provide such control with respect to the industrial process or machine 18, for example, by communicating over channels first and second 20*a* and 20*b* with first and second industrial control elements 22*a* and 22*b*, respectively, integrated with respect to the industrial process or machine 18.

The devices 16 can be any type of industrial control device for providing control with respect to the industrial process or machine 18. Examples of types of devices 16 can include variable frequency drives, mass flow meters, Highway Addressable Remote Transducer (HART) devices, I/O modules, and the like. A variable frequency drive is an adjustable-speed drive which may be used in electro-mechanical drive systems to control Alternating Current (AC) motor speed and torque by varying motor input frequency and voltage. In one aspect, the device 16*a* could be variable frequency drive configured to drive a load represented by the first element 22*a*. A mass flow meter is a device which can measure a mass flow rate of a fluid traveling through a volume. In another aspect, the device 16*a* could be an analog I/O module configured to communicate with a mass flow meter represented by the first element 22*a*. The HART protocol is a hybrid analog/digital industrial automation protocol that can communicate over legacy 4-20 mA analog instrumentation current loops. In another aspect, the device 16*a* could be a HART device configured to communicate with a HART compatible process module represented by the first element 22*a*. In yet another aspect, the device 16*a* could be an industrial control I/O module configured to communicate with sensors and/or actuators represented by the first element 22a. It should be appreciated that various types of devices, including as described in "Common Industrial Protocol (CIP™) and the Family of CIP Networks," Copyright 2016, ODVA, Inc., in combination or otherwise, could be implemented in the system 10 according to the present invention. Moreover, it should be appreciated that the above examples could be further divided into types of devices according to having a common set of configurations as will be described herein.

The controller 12 can communicate with the devices 16 over a control network 24 suitable for highly reliable and available real-time communication. The control network 24 could be, for example, a ControlNet or EtherNet/IP network configured to guarantee maximum communication delays by pre-scheduling the communication capacity of the network, and/or providing redundant communication capabilities for high-availability. In addition, the control network 24 can employ connected messaging, such as Common Industrial Protocol (CIP), in which the bandwidth of the network and buffer space is pre-allocated to dedicated connections to prevent lost or unpredictably delayed data transfer that can occur in standard network protocols such as Ethernet.

The controller 12 can also operate in communication with a workstation 26 which, in turn, is in communication with a data structure 28, Accordingly, the workstation 26 can be used by a user to commission, monitor and/or modify operation of the system 10, including with respect to the control program 14.

With additional reference to FIG. 2, a diagram of a program environment 40 for building the control program 14 is provided in accordance with an aspect of the invention. While the workstation 26 can be used to execute the program environment 40 to build the control program 14, in another aspect, a separate workstation can also be used to execute the program environment 40 to build the control program 14 for the system 10. The program environment 40 can include a library 42 including multiple device type classes 43 for devices 16, a user interface 44 and a diagrammatical arrangement 46 of the control program 14.

The device type classes 43 can be held in the data structure 28. Each device type class corresponds to a type of device 16 having a common set of configurations, which can include common functions, parameters, I/O, services and the like. In a preferred implementation, device type classes can correspond to particular devices having a common model or part number. For example, a first device type class can correspond to a variable frequency drive that is a "PowerFlex 755T Low Voltage AC Drive," while a second device type class can correspond to variable frequency drive that is a "PowerFlex 7000 Medium Voltage AC Drive," each available from Rockwell Automation, Inc.

Each device type class 43 can include a device profile 50. With additional reference to FIG. 3, the device profile 50 can include multiple parameters configured to allow communication with a device 16 corresponding to the device type class 43 in the control program 14. Accordingly, the parameters can be primitive data sets defining variables, formats (including with respect to bit and byte settings), data types, protocols, and the like, for enabling such communication. By way of example, for a variable frequency drive, such as the PowerFlex 7000 Medium Voltage AC Drive, the parameters can include: (1) a speed parameter specific to the drive, (2) a torque parameter specific to the drive, (3) a direction parameter specific to the drive, (4) a starting parameter specific to the drive and/or (5) a stopping parameter specific to the drive.

In addition, each device type class 43 can include one or more device-specific instructions 52. With additional reference to FIG. 4, each instruction 52 is configured to cause the device 16 to execute an action in the control program 14. Such actions are dependent upon the device type and its capabilities. Also, the instructions 52 can be configured to use one or more parameters of the device profile 50 to execute the action. Accordingly, the instructions 52 can be code fragments for implementing logic with respect to the device 16. Typically, this may be logic that has been determined to be frequently used in many systems. Moreover, the instructions can be configured as Add On Instructions (AOI), including as described in the "Logix5000 Controllers Add On Instructions Programming Manual," Publication 1756-PM010H-EN-P, December 2016, which document is incorporated herein by reference in its entirety.

By way of example, for a variable frequency drive, such as the PowerFlex 7000 Medium Voltage AC Drive, the instructions 52 can include a first instruction 54 ("instruction x"), which could be configured to start rotation of the drive in a particular direction, and/or a second instruction 56 ("instruction y"), which could be configured to spin the drive at a desired RPM. Accordingly, the first instruction 54 could apply the direction parameter (3) and the starting parameter (4) to accomplish the desired start action, whereas the second instruction 56 could apply the speed parameter (1) and the torque parameter (2) to accomplish the desired RPM action. Similarly, for a mass flow meter, instructions 52 could include a command to measure a mass flow rate of a fluid using a fluid sensing parameter, and/or a command to measure a temperature value using a temperature sensing parameter. Also, for a HART device, instructions 52 could include a command to schedule data from process modules on the channels 20, such as by way of a round robin scheme. Accordingly, a variety of device specific instructions can be provided in the device type class 43 for reducing the time and complexity for building a control program using a particular device type.

Through the user interface 44, a user can instantiate industrial control devices from a device type class 43 in the diagrammatical arrangement 46 of the control program 14. The user interface can enable such instantiations, such as by way of a drag and drop action by the user in a Graphical User Interface (GUI) implemented by the workstation or HMI implementing the program environment 40, which could supplement, for example, the RS-Logix 5000 software development environment as available from Rockwell Automation, Inc.. For example, a user could select a third device type class 43c ("0003"), which could correspond to the PowerFlex 7000 Medium Voltage AC Drive, and provide first and second instantiations 53a and 53b (labelled "A" and "B"), respectively, of the device type class 43c, in the diagrammatical arrangement 46. Moreover, the user can connect such instantiations in the user's program as desired, such as on a common control network connected to a PLC, to implement the user's desired configuration for controlling the industrial process or machine 18.

In addition, the user can configure the instantiations to execute one or more of the instruction 52 from the device type class 43, In particular, the user can select a manner in which one or more of the instructions 52 are integrated into logic of the control program for controlling the industrial process or machine 18. For example, the user could: (1) inject one or more of the instructions 52 into the diagrammatical arrangement 46 of the control program following a selection of the instruction 52 by a user through the user interface 44; (2) inject the instructions 52 into the diagrammatical arrangement 46 of the control program upon instantiation of the device type class 43 in the diagrammatical arrangement 46; (3) inject the instructions 52 into the program environment 40 for later selection by a user, upon installation of a device type class 43 in the library 42; and/or (4) display the instructions 52 of all installed device type classes 43 in the program environment 40 for a user to select. Then, the workstation or HMI implementing the program environment 40 can synthesize the diagrammatical arrangement 46 into the control program 14 having a format configured to execute on the controller 12.

Figure 5:
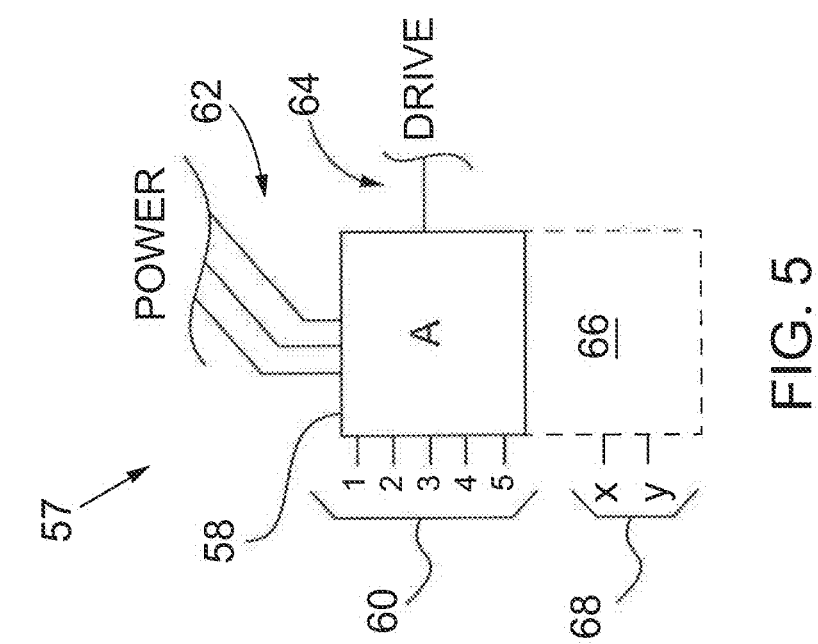
FIG. 5 is an exemplar model representation of an instantiation of a device of the system of FIG. 1, modeled in the program environment of FIG. 2, in accordance with aspect of the invention.

Accordingly, as a result, the knowledge and/or effort required build the control program 14 associated with a device or application can be reduced with the preconfigured instructions 52 based on expert knowledge from the device manufacturer. With additional reference to FIG. 5, an exemplar model representation 57 of a device 16 that is a type of variable frequency drive is provided in accordance with aspect of the invention. Ire the model representation 57, a first portion 58 represents a standard portion for the drive which may be accessible in the program environment 40 upon instantiation. The first portion 58 can include an I/O section 60 that is accessible in the program environment 40 according to established settings, such as: (1) the speed parameter, (2) the torque parameter, (3) the direction parameter, (4) the starting parameter and/or (5) the stopping parameter for a variable frequency drive. Accordingly, by arranging the control program 14 to send messages to the drive using such parameters, three phase power inputs can be received at a process input section 62, and delivered at a process output section 64, to operate the drive in the process or machine 18.

In addition, to reduce the knowledge and/or effort required build the control program 14, an augmented portion 66 is added in the model representation 57. The augmented portion 66 adds an augmented I/O section 68 that is now accessible in the program environment 40, such as: (1) the "instruction x" to start rotation of the drive in a particular direction, and/or (2) the "instruction y" to spin the drive at a desired RPM. As a result, from the user's perspective through the program environment 40, the model representation 57 provides enhanced capabilities and features by having the augmented portion 66 for ease of integration into the control program 14.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A system for building an industrial control program for controlling industrial control devices, the system comprising:
    a data structure holding a plurality of device type classes, each device type class corresponding to a type of industrial control device having a common configuration, wherein each device type class includes first and second portions, wherein:
    the first portion includes a device profile comprising a plurality of parameters which enable communication between an industrial controller executing the industrial control program and an industrial control device corresponding to the type of industrial control device, the parameters defining variables and a protocol for enabling the communication; and
    the second portion includes a device specific instruction configured for injection into logic of the industrial control program to cause the industrial control device corresponding to the device type class to execute an action in the industrial control program, the device-specific instruction comprising a code fragment for implementing logic with respect to the industrial control device, wherein the device-specific instruction is configured to use at least one parameter of the plurality of parameters from the first portion to execute the action; and
    a processor executing a program stored in a non-transient medium, the processor executing the program to:
    instantiate a model of an industrial control device from a device type class of the plurality of device type classes in an industrial control program;
    provide an option to a user to inject a device-specific instruction from the second portion of the device type class into logic of the industrial control program;
    following a selection by the user, configure the industrial control program to include the device-specific instruction from the device type class in the industrial control program.

2. The system of claim 1, wherein the plurality of device type classes includes at least one device type class corresponding to a variable frequency drive, a mass flow meter or a Highway Addressable Remote Transducer (HART) device.

3. The system of claim 2, wherein the at least one device type class corresponds to a variable frequency drive, and the device-specific instruction is configured to use a parameter corresponding to speed, torque, direction, starting or stopping for the variable frequency drive.

4. The system of claim 3, wherein the device-specific instruction for the at least one device type class is a command for the variable frequency drive to start rotation in a particular direction.

5. The system of claim 2, wherein the at least one device type class corresponds to a mass flow meter, and wherein the device-specific instruction for the at least one device type class is a command for the mass flow meter to measure a mass flow rate of a fluid.

6. The system of claim 2, wherein the at least one device type class corresponds to a HART device, and wherein the device-specific instruction for the at least one device type class is a command for the HART device to schedule data on a plurality of channels connected to the HART device.

7. The system of claim 1, wherein the model of the industrial control device is a first model, and further comprising a second model of the industrial control device from the device type class.

8. The system of claim 1, further comprising a Human Machine Interface (HMI), wherein the model of the industrial control device is instantiated and configured from the HMI.

9. The system of claim 8, further comprising executing the program to display a Graphical User Interface (GUI) illustrating the industrial control device as part of the industrial control program in a diagrammatical arrangement.

10. The system of claim 9, further comprising executing the program to synthesize the diagrammatical arrangement into a format configured to execute on a Programmable Logic Controller (PLC).

11. A method for building an industrial control program, the industrial control program for controlling a plurality of industrial control devices by reading inputs from sensors and calculating outputs for actuators, the method comprising:
holding a plurality of device type classes in a data structure, each device type class corresponding to a type of industrial control device having a common configuration, wherein each device type class includes first and second portions, wherein:
the first portion includes a device profile comprising a plurality of parameters which enable communication between an industrial controller executing the industrial control program and an industrial control device corresponding to the type of industrial control device, the parameters defining variables and a protocol for enabling the communication; and
the second portion includes a device-specific instruction configured for injection into logic of the industrial control program to cause the industrial control device corresponding to the device type class to execute an action in the industrial control program, the device-specific instruction comprising a code fragment for implementing logic with respect to the industrial control device, wherein the device-specific instruction is configured to use at least one parameter of the plurality of parameters to execute the action;
instantiating a model of an industrial control device from a device type class of the plurality of device type classes in an industrial control program;
providing an option to a user to inject a device-specific instruction from the second portion of the device type class into logic of the industrial control program; and
following a selection by the user, configuring the industrial control program to include the device-specific instruction from the device type class in the industrial control program.

12. The method of claim 11, wherein the plurality of device type classes includes at least one device type class corresponding to a variable frequency drive, a mass flow meter or a Highway Addressable Remote Transducer (HART) device.

13. The method of claim 11, wherein the model of the industrial control device is a first model, and further comprising a second model of the industrial control device from the device type class.

14. The method of claim 11, further comprising instantiating and configuring the model of the industrial control device from an HMI.

15. The method of claim 14, further comprising displaying to the HMI a GUI illustrating the industrial control device as part of the industrial control program in a diagrammatical arrangement.

16. The method of claim 15, further comprising synthesizing the diagrammatical arrangement into a format configured to execute on a PLC.

* * * * *